(12) United States Patent
Mishra et al.

(10) Patent No.: US 11,438,130 B2
(45) Date of Patent: *Sep. 6, 2022

(54) FULL-DUPLEX MESH NETWORKS

(71) Applicant: Parallel Wireless, Inc., Nashua, NH (US)

(72) Inventors: Rajesh Kumar Mishra, Westford, MA (US); Steven Paul Papa, Windham, NH (US); Yang Cao, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 9 days.

This patent is subject to a terminal disclaimer.

(21) Appl. No.: 16/883,978

(22) Filed: May 26, 2020

(65) Prior Publication Data

US 2020/0287701 A1  Sep. 10, 2020

Related U.S. Application Data

(63) Continuation of application No. 15/926,723, filed on Mar. 20, 2018, now Pat. No. 10,666,414, which is a continuation of application No. 14/876,808, filed on Oct. 6, 2015, now Pat. No. 9,923,705.

(60) Provisional application No. 62/060,237, filed on Oct. 6, 2014.

(51) Int. Cl.
  *H04L 5/14* (2006.01)
  *H04L 5/00* (2006.01)

(52) U.S. Cl.
  CPC ............... *H04L 5/14* (2013.01); *H04L 5/001* (2013.01); *H04L 5/0023* (2013.01)

(58) Field of Classification Search
  None
  See application file for complete search history.

(56) References Cited

U.S. PATENT DOCUMENTS

| | | | | |
|---|---|---|---|---|
| 2013/0114539 A1* | 5/2013 | Kim | ....................... | H04L 1/0061 370/329 |
| 2013/0258895 A1* | 10/2013 | Kim | ....................... | H04L 5/0055 370/252 |
| 2014/0119339 A1* | 5/2014 | Yang | ..................... | H04L 1/1822 370/331 |
| 2014/0146697 A1* | 5/2014 | Kim | .................... | H04W 72/042 370/252 |
| 2014/0243002 A1* | 8/2014 | Muruganathan | ...... | H04L 5/0094 455/450 |

(Continued)

*Primary Examiner* — Eunsook Choi
(74) *Attorney, Agent, or Firm* — Michael Y. Saji; David W. Rouille

(57) ABSTRACT

Systems and methods relating to full duplex mesh networks are disclosed. In one embodiment, a mesh network comprising a first base station may be disclosed, the first base station comprising: a first transceiver for transmitting and receiving to and from the first base station on the single frequency band; and a second transceiver for transmitting and receiving to and from a second base station on the single frequency band, each transceiver of each transceiver node performing self-interference cancellation to send and receive full duplex data on the single frequency band at substantially the same time, thereby enabling the creation of a mesh network with at least one transceiver node having both access and backhaul using only the single frequency band.

21 Claims, 4 Drawing Sheets

(56) References Cited

U.S. PATENT DOCUMENTS

| | | | |
|---|---|---|---|
| 2015/0056931 A1* | 2/2015 | Yerramalli | H04W 16/14 455/67.13 |
| 2015/0092578 A1* | 4/2015 | Ingale | H04W 52/0209 370/252 |
| 2015/0312905 A1* | 10/2015 | Seo | H04B 7/2656 370/280 |
| 2015/0327275 A1* | 11/2015 | Kwon | H04W 28/085 370/236 |
| 2015/0334607 A1* | 11/2015 | Singh | H04W 52/0206 455/437 |
| 2016/0081091 A1* | 3/2016 | Kim | H04L 5/14 370/276 |
| 2016/0087769 A1* | 3/2016 | Wild | H04L 5/0057 370/329 |
| 2016/0127913 A1* | 5/2016 | Li | H04W 48/16 370/329 |
| 2016/0198475 A1* | 7/2016 | Uchiyama | H04B 17/11 370/329 |
| 2016/0249302 A1* | 8/2016 | Uchiyama | H04W 52/243 |
| 2016/0269094 A1* | 9/2016 | Kim | H04L 5/14 |
| 2017/0187416 A1* | 6/2017 | Kim | H04L 5/1469 |

* cited by examiner

FULL-DUPLEX MESH NETWORKS

CROSS-REFERENCE TO RELATED APPLICATIONS

This application is a continuation of, and claims the benefit under 35 U.S.C. § 120 of, U.S. patent application Ser. No. 15/926,723, filed on Mar. 20, 2018 and entitled "Full-Duplex Mesh Networks," which itself is a continuation of, and claims the benefit under 35 U.S.C. § 120 of, U.S. patent application Ser. No. 14/876,808, filed on Oct. 6, 2015 and entitled "Full-Duplex Mesh Networks," which itself is a non-provisional conversion of, and claims the benefit of priority to, U.S. Provisional Patent Application No. 62/060,237, entitled "Full-Duplex LTE Mesh Networks," filed on Oct. 6, 2014, each of which is hereby incorporated by reference for all purposes. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; U.S. patent application Ser. No. 14/183,176, entitled "Methods of Incorporating an Ad Hoc Cellular Network into a Fixed Cellular Network," filed Feb. 18, 2014; U.S. patent application Ser. No. 14/024,717, entitled "Heterogeneous Self-Organizing Network for Access and Backhaul," and filed on Sep. 12, 2013; U.S. patent application Ser. No. 14/146,857, entitled"Heterogeneous Self-Organizing Network for Access and Backhaul," and filed on Jan. 3, 2014; International Patent Application No. PCT/US14/29145, entitled "Methods of Enabling Base Station Functionality in a User Equipment," filed Mar. 14, 2014; U.S. patent application Ser. No. 14/453,365, entitled "Systems and Methods for Providing LTE-Based Backhaul," filed Aug. 6, 2014; and U.S. patent application Ser. No. 14/571,250, entitled "Virtualization of the Evolved Packet Core to Create a Local EPC," filed on Dec. 15, 2014.

BACKGROUND

Currently, mesh network base stations may use one antenna to communicate with user equipments (UEs) and other user devices, thereby providing access to those UEs, and another antenna to provide backhaul via, for example, a macro-cell base station. Mesh network base stations often use two frequency bands to obtain this functionality. For example, a mesh network base station may use the 800 MHz band to provide access to UEs and the 1800 MHz band to connect to the macro-cell base station for backhaul. The mesh network base station thus uses both an 800 MHz antenna and an 1800 MHz antenna. These antennas are typically electrically isolated to reduce interference.

Frequency division duplexing (FDD) is a common technique for allowing a transmitter and a receiver to both broadcast at the same time. However, it requires that the transmitter and receiver use different carrier frequencies, i.e., frequency bands.

Also known in the art are techniques for providing self-interference cancellation (SIC). SIC enables in-band full-duplex communication using only a single antenna. See, e.g., "Applications of Self-Interference Cancellation in 5G and Beyond" by Hong et al., IEEE Comm's Magazine, Vol. 52, No. 2 (2014); "Full Duplex Radios," Bharadia et al., SIGCOMM 2013; and Home Page of the Stanford Networked Systems Group, Full Duplex Project, available at http://snsg.stanford.edu/projects/full-duplex/, each of which is incorporated herein by reference in their entirety. See also A. K. Khandani et al., "Two-Way Wireless," presentation given at Univ. of Waterloo on Apr. 25, 2012, and U.S. Pat. No. 7,817,641, US20130301487, WO2013173250, each of which is also incorporated herein by reference in their entirety.

However, a need exists for providing both access and backhaul communication on a single band on a mesh network base station.

SUMMARY

Figure 1:
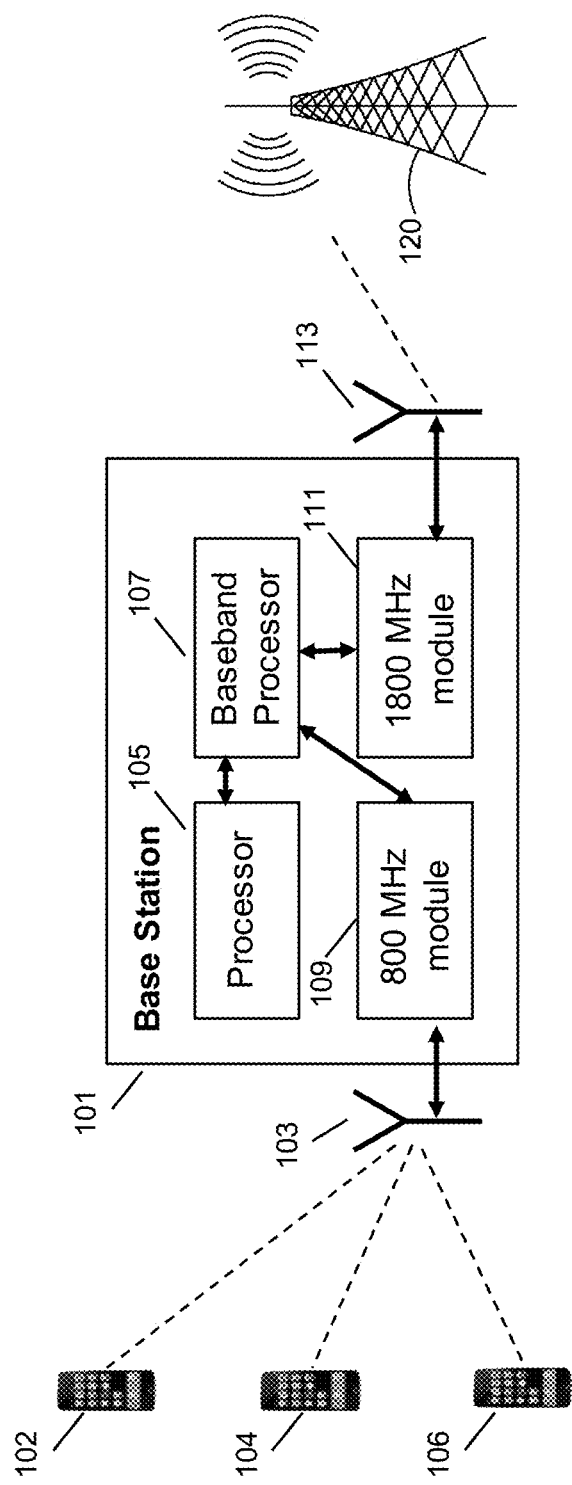
FIG. 1 is a schematic diagram of a base station in communication with a macro cell base station, in accordance with the prior art.

Systems and methods relating to full duplex mesh networks are disclosed.

In one embodiment, a mesh network comprising a plurality of transceiver nodes using a single frequency band may be disclosed, each transceiver node comprising: a first transceiver for transmitting and receiving to and from a backhaul node on the single frequency band; and a second transceiver for transmitting and receiving to and from an access node on the single frequency band, each transceiver of each transceiver node performing self-interference cancellation to send and receive full duplex data on the single frequency band at substantially the same time, thereby enabling the creation of a mesh network with at least one transceiver node having both access and backhaul using only the single frequency band.

The single frequency band may be used by each of the plurality of transceiver nodes. Each transceiver may comprise a single antenna for both transmitting and receiving on the single frequency band. The single frequency band may be LTE band 14. Each transceiver of each transceiver node may be capable of transmitting and receiving on one or more LTE frequency bands. Each transceiver may be enabled to provide full-duplex communication. Each transceiver may be a single antenna. Each transceiver may form a self-organizing mesh with access and backhaul without coordination from a core network. Each transceiver may be an eNodeB. Each transceiver node may further comprise a self-interference cancellation circuit for canceling interference caused by transmissions from the first transceiver at the first transceiver, and for canceling interference caused by transmissions from the second transceiver at the second transceiver. Each transceiver node may further comprise a self-interference cancellation circuit for canceling interference caused by transmissions from the first transceiver at the second transceiver, and for canceling interference caused by transmissions from the second transceiver at the first transceiver. The backhaul node may further comprise a modified LTE base station configured to use an LTE uplink band for sending data and an LTE downlink band for receiving data.

In another embodiment, a network node performing self-interference cancellation may be disclosed, comprising: an integrated long term evolution (LTE) eNodeB; an integrated LTE user equipment (UE); and self-interference cancellation circuitry, the self-interference cancellation circuitry reducing radio frequency interference at the integrated LTE eNodeB caused by the transmission of signals by the integrated LTE UE, the self-interference cancellation circuitry further reducing radio frequency interference at the integrated LTE UE caused by the transmission of signals by the integrated LTE eNodeB.

The network node may operate on LTE band 14. The network node may operate on at least one of LTE bands 13 and 17. The network node may operate on an uplink band and a downlink band; wherein the uplink band may be used for receiving data from one or more UEs and also for sending data to a backhaul node; and wherein the downlink band may be used for sending data to one or more UEs and also for receiving data from a backhaul node. The integrated LTE eNodeB and the integrated LTE UE may operate on one or two identical LTE bands. The integrated LTE UE may be used to provide backhaul for UEs connected to the integrated LTE eNodeB.

In another embodiment, a method of reducing radio frequency interference between a radio transmitter and a radio receiver physically co-located at a transceiver node may be disclosed, comprising: performing linear digital self-interference cancellation for the radio receiver based on the radio transmitter; performing non-linear digital self-interference cancellation based on the radio transmitter; performing analog self-interference cancellation based on the radio transmitter; and sending and receiving radio frequency signals with self-interference cancellation to a mobile mesh network node.

The method may further comprise physically separating antennas associated with the radio transmitter and the radio receiver, thereby further reducing radio frequency interference. The radio transmitter may transmit on a first frequency band, and the radio receiver receives on the first frequency band. The radio transmitter may transmit on a first frequency band, the radio receiver receives on a second frequency band, andthe first and the second frequency bands are adjacent. The radio transmitter may transmit on a first frequency band, the radio receiver receives on a second frequency band, andthe first and the second frequency bands are non-adjacent and separated by a guard band. One of the radio transmitter or the radio receiver may be an LTE radio. One of the radio transmitter or the radio receiver may be a Wi-Fi radio, a television white space (TVWS) radio, or a microwave radio. Self-interference cancellation may be used to achieve at least 80 dB of self-interference cancellation for the radio receiver. Self-interference cancellation may be used to achieve between 100 dB and 110 dB of self-interference cancellation for the radio receiver. Multiple-in, multiple out (MIMO) may be used to increase the self-interference cancellation for the radio receiver. Analog self-interference cancellation may be used to cancel transmitter noise. Analog self-interference cancellation may be performed using a plurality of analog delay lines for assigning weights to an interpolation algorithm.

DETAILED DESCRIPTION

Self-Interference Cancellation

As described herein, self-interference cancellation (SIC) is a technique whereby interference from a device may be canceled at that same device in one or more of the following ways: (1) Using knowledge of the digital signal that is intended to be emitted to cancel part of the interference; (2) Using knowledge of the digital signal that is intended to be emitted, together with modeling of harmonics and other distortions that result from the non-linear operation of a given transmitter, to cancel another part of the interference; or (3) Using an analog or digital sample of noise generated in the transmitter to cancel, in an analog manner that may involve the use of analog delay lines, an additional part of the interference. Use of a combination of analog and digital self-interference cancellation techniques may be called hybrid self-interference cancellation.

SIC using a digital approach may include digital pre-distortion (DPD), which is modeling the gain and phase characteristics of a power amplifier to produce an input signal to a power amplifier that results in a more-linear output signal, or crest factor reduction (CFR), which is processing used to reduce the dynamic range of a transmitted signal so that amplifiers being used to transmit that signal can be run with less backoff. Other digital signal processing techniques, typically performed using a digital signal processor (DSP) or field programable gate array (FPGA), may be used as part of SIC or digital modeling.

In some embodiments, as described herein, SIC may be performed using one or more of the following: a DPD module; a CFR module; an analog interference sampling module; an analog delay line; a baseband processor; and a digital signal processor (DSP). In some embodiments, DPD, CFR, or other SIC approaches may be implemented using field-programmable gate arrays (FPGAs). In some embodiments, digital SIC may be applied at the baseband chip, or before or after baseband processing. In some embodiments, DPD may be implemented adjacent to a power amplification step at a power amplifier.

In some embodiments, SIC may be performed using analog cancellation techniques. An analog antenna or signal line may pick up actual self-interference generated by the system, and this analog line may be coupled to an output signal and processed therewith, such as by subtracting the interference pattern therefrom, to reduce self-interference.

In some embodiments, SIC may be performed using a digital model of the characteristics of the overall system. The model may be fed with either an sampled analog input of actual interference or a copy of the pre-SIC digital signal to be transmitted at the system. The model may process the inputs to predict the self-interference and then alter the digital signal to reduce the self-interference.

In some embodiments, SIC may be performed using a combination of analog sampling and digital processing. In this case, a SIC-enabled chip may enable, for example, an analog delay line or analog sampling line coupled to an RF output of the system to also be coupled to, for example, a baseband chip, SIC chip, FPGA, or DSP. The DSP or other chip may then sample the analog signal and perform digital processing to cancel self-interference before emitting its output signal.

In some embodiments, SIC may be integrated into a baseband processor or digital signal processor.

By combining each of these approaches, reductions of self-interference may be achieved up to −110 dB, with a corresponding ability to transmit in full duplex at nearly double the speed of half-duplex transmissions, in some instances.

Need for Full Duplex

The situation may arise that only a single frequency band is available. For example, if a network operator only possesses a license to a single frequency band, other bands may not be used. As another example, only a limited number of bands are designated as public safety bands, and ideally, public safety equipment would be enabled to provide both access and backhaul capability using only those bands and without depending on non-public safety bands.

It may be possible to partition a single available frequency band into two or more sub-bands. However, doing so reduces the throughput of the two sub-bands relative to the single band because of guard bands, imperfect filtering, and a higher noise floor resulting from interference between the two sub-bands.

The situation may also arise that an operator desires to increase utilization of its existing frequency bands.

The situation may also arise that an operator desires to make use of a particular band to both transmit with one antenna and send with another antenna. For example, using Wi-Fi on a 2.4 GHz unlicensed frequency band, uplink and downlink are not segregated onto separate frequency bands, so the ability to use a particular frequency at the same time for both uplink and downlink may up to double the potential throughput of the link.

Advantages of Full Duplex

In contrast, full-duplex frequency band utilization achieves three desirable goals: (1) it significantly increases throughput by allowing the same band to be used at the same time to send and receive; (2) it permits re-use of adjacent frequency bands via improved filtering; and (3) it permits re-use of limited frequency bands or a single frequency band for both access and backhaul, where access is used to mean a network for user devices, and backhaul is used to mean a connection to an operator network or the Internet for forwarding traffic received from the user devices.

In addition, the use of self-cancellation information in mesh networking and routing applications permits a single mobile base station with two or more antennas to use information about data transmitted by one antenna to perform self-cancellation for the other antenna. This is particularly helpful when using two adjacent frequency bands, for instance, when dividing a 10 MHz LTE channel into two adjacent 5 MHz channels, and using the first 5 MHz for backhaul and 5 MHz for access. The effect is that of using a higher-performance analog filter, without the typical expense thereof. Reduced use of guard bands is also enabled.

Applications in Mesh Networks

In some embodiments, a mesh network may be created using a plurality of mobile base stations provided with full-duplex capability. The mobile base stations may be in-vehicle base stations. Such base stations may be used as part of a network used to rapidly deploy a network in an area where fixed cell towers are unavailable or impractical.

In such a situation, the mobile base stations need to be able to communicate with each other and with mobile devices (i.e., access), as well as with the broader Internet or other outside communications networks (i.e., backhaul). Access may mean the provision of connections from the mobile base station to one or more user equipments (UEs). Backhaul refers to the use of a connection from a base station to a network that is connected to the Internet, an IP network connected to the Internet, a private network or a carrier network for sending and receiving data to and from one or more UEs connected to the base station. Backhaul networks, while traditionally using wired connections, may also use wireless connections, including line-of-sight and non-line-of-sight (n/NLOS) connections, directional microwave connections, satellite connections, etc.

In some embodiments, full-duplex UE to UE communications may be enabled. These communications may be enabled by instructions from a core network node, a base station node, or by software on one UE or the other UE. Full-duplex UE-UE communications may be in the context of UE relays. Full-duplex UE-UE communications may also be in the context of two local UEs communicating with each other on an unused macro frequency, as described in LTE Release 12 and in Duplo Deliverable 1.1, Ref Ares (2013) 995794, hereby incorporated in its entirety. UE-UE communications may be performed at a low power to reduce interference. Full-duplex communications may be on a time-division basis or a frequency division basis, in some embodiments. In the case that full-duplex communications are enabled between UEs, each UE may cancel its own interference for effective self-interference cancellation, thus providing full duplex capability.

Full-duplex capability enables the use of a single band for both access and backhaul (i.e., in-band backhaul). However, full-duplex capability may be achieved by adding additional transceivers and antennas to the mobile base stations, but doing so imposes a cost due to radio interference generated at the mobile base stations by each transmitter antenna. Self-interference cancellation may be used to enhance the full-duplex capability of the mesh network.

In some embodiments, a first mesh network base station is provided with in-band backhaul capability. Other network nodes connected to the first mesh network base station are then enabled to use the first mesh network base station's full-duplex backhaul as backhaul for their respective UEs.

In some embodiments, SIC may be employed to provide logically-configurable adaptive frequency filtering in a base station that is configurable to operate on multiple frequency bands. Such configurable filtering may be coordinated and configured by use of a self-organizing network (SON) configuration module that has been enhanced to, e.g., increase transmission power in adjacent transmission bands or in physically-adjacent coverage areas, the SON module being located either at a base station or in the cloud at a coordination server.

In some embodiments, an X2 protocol message may be used to reserve either frequency channels or time division channels. Signaling may be performed either between a macro cell and an eNodeB, between eNodeBs, or via another signaling path. In some embodiments, signaling may be performed between a policy server on the network and the one or more base stations, for storing and retrieving policies relating to frequency and/or time channel multiplexing and reuse. Coordination may take into account which base stations have SIC and which do not, and which base stations are observed by measurement reports to be interfering with which other base stations.

In some embodiments, the use of a mobile mesh base station may cause interference to users presently communicating with a macro cell. In the case that a mobile mesh base station is present, the mobile mesh base station may cause a handoff by the users presently communicated with the macro cell. Once the mobile mesh base station has received the handoff, and becomes the active base station for the users, the mobile mesh base station may provide access to the users. Backhaul for the users may be provided by the use of a full-duplex connection provided by one or more nodes in the mesh. The full-duplex connection may be a self-interference cancelling connection for providing backhaul over LTE.

Applications in LTE Networks

In some embodiments, LTE Band 14 may be used using full-duplex capability to provide in-band access and backhaul on the same channel. LTE Band 14 may be used in frequency division duplex (FDD) mode. LTE Band 14 may be used for public safety applications, such as by fire, rescue, and police personnel, in some embodiments. LTE Band 14 may specifically refer to a band using 788-798 MHz for uplink and 758-768 MHz for downlink.

In some embodiments, full-duplex communications using time division duplexing (TDD) is also enabled, as self-interference cancellation works in the case of TDD as well. TDD may be used in the context of a mobile mesh network.

An example of an application in an LTE network follows. A mobile base station may be provided with an LTE radio and software stack that together provide eNodeB functionality for UEs that attach to the mobile base station. To provide backhaul, the mobile base station may also be provided with a LTE card that acts as a UE and connects to another eNodeB. However, if both the LTE eNodeB and the LTE UE operate on the same frequency band, interference may result. This is particularly the case because the two devices may be co-located in a single enclosure. Self-interference cancellation may be used to reduce the interference between the LTE eNodeB's transmissions and the reception of the LTE UE, and vice versa.

In some embodiments, a guard band may or may not be necessary between adjacent bands that are used by the mobile base station when using self-cancellation functionality.

Advantageously, according to certain embodiments as described above, the number of antennas required may be reduced; the number of frequency bands used to provide the combination of access and backhaul may be reduced; and since the bulk of communications are kept within the same frequency band, switching between bands on handover between base stations may also be reduced.

In some embodiments, interference may be canceled between some UL and DL signals. Typically, because UL and DL use different frequencies, interference is minimal in the FDD domain. However, once full duplex is enabled over FDD, some interference patterns that may occur that more typically appear in TDD domains. Examples of such interference patterns, and techniques for mitigating such interference, appear in WO2013048582, which is hereby incorporated in its entirety.

WO2013048582 assumes that some out-of-band channel exists between the aggressor and the victim node—for example, separate backhaul, or the central base-band interconnection in the case of cloud-RAN scenario. With such a separate channel, the interfering signal can be passed from the aggressor to the victim. Based on this, the victim node can effectively use such knowledge to cancel out such interfering signal from its combined input. An out-of-band channel may be provided, in some embodiments, using a direct X2 connection between two base stations with full duplex functionality. In another alternative, an out-of-band channel may be provided, in some embodiments, using a connection via a cloud component.

FIGURES

FIG. 1 is a schematic diagram of a base station in communication with a macro cell base station, in accordance with the prior art. Base station 101 is in communication with UEs 102, 104, 106 using antenna 103 over an 800 MHz band, while also being in communication with a macro cell base station 120 using antenna 113 via an 1800 MHz band. Base station 101 may be a small cell base station.

Base station 101 includes processor 105, in communication with baseband processor 107. Base station 101 also includes 800 MHz module 109 and 1800 MHz module 111. Each module is used for one band. Transmissions on each band are isolated from the other band by frequency. Baseband processor 107 may include two baseband modules, each controlling a different band. Each module 109, 111 may include a power amplifier and a filter.

Base station 101 may be a multi-RAT base station, in which the 800 MHz band and the 1800 MHz band are used for different radio access technologies. Base station 101 may be a mobile base station.

Figure 2:
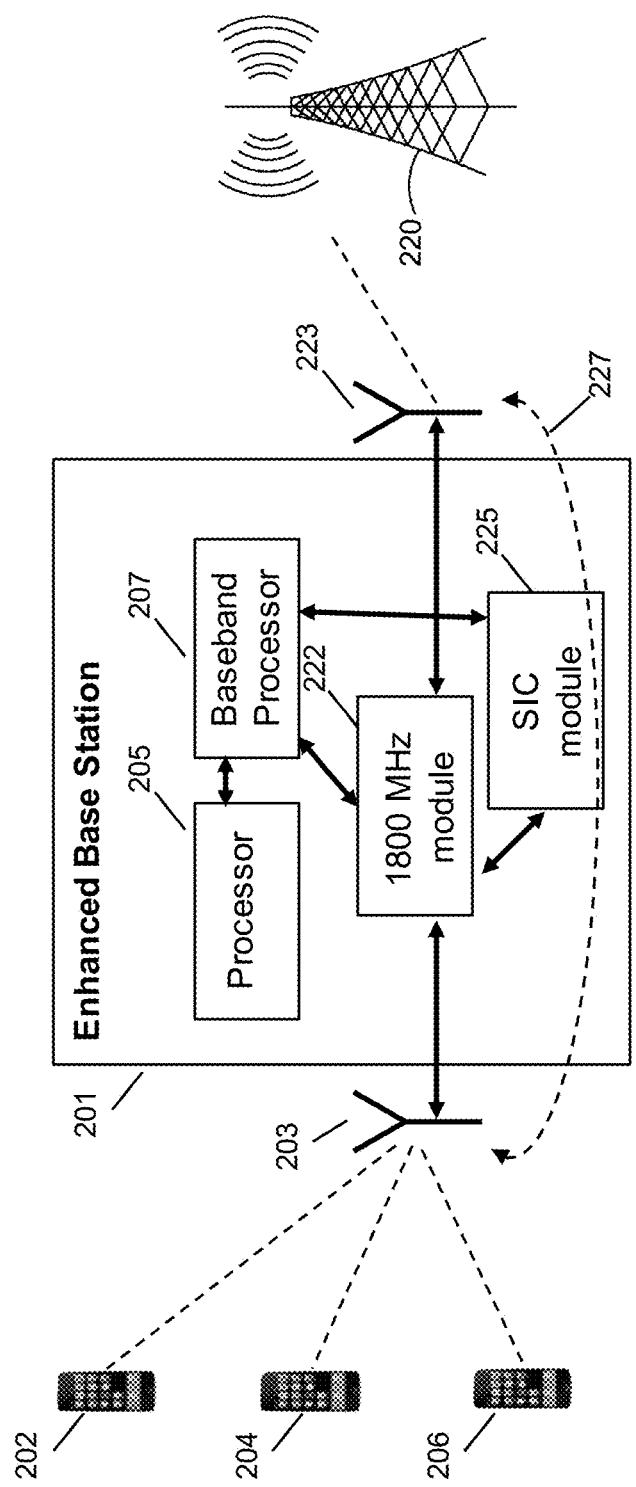
FIG. 2 is a schematic diagram of a base station in communication with a macro cell base station using self-interference cancellation for full duplex, in accordance with some embodiments.

FIG. 2 is a schematic diagram of a base station in communication with a macro cell base station using self-interference cancellation for full duplex, in accordance with some embodiments. Base station 201 depicts a mesh network base station that is in communication with both mobile nodes and backhaul using the same frequency band using full-duplex communication. The same frequency band is used for receiving data from UEs 202, 204, 206 and for sending data to another macro base station 220 as backhaul. Here, 1800 MHz is depicted, but any band may be used in various embodiments.

Enhanced base station 201 includes processor 205 in communication with baseband processor 207. Baseband processor 207 is in communication with 1800 MHz module 222, which generates a 1800 MHz signal for antenna 203 and also for antenna 223, and which receives signals from antenna 203 and antenna 223 as well. Baseband processor 207 is also in communication with self-interference cancellation (SIC) module 225. 1800 MHz module 222 may also include a power amplifier and a filter. Switching may be used to allow module 222 to operate with both antenna 203 and 223, or, separate transmit and receive chains may be provided for each antenna within module 222.

SIC module 225 is on a signal path between antenna 223 and antenna 203, and samples interfering transmissions sent from either antenna to cancel the interference at the other antenna. For example, when base station 201 is transmitting to base station 220, the transmission signal may be received at SIC module 225, in some embodiments prior to or after power amplification, and the transmission signal may be used to cancel interference received at antenna 203 as a result of the transmission to base station 220.

SIC module 225 is also in communication with baseband processor 207 to digitally sample interference, before transmission or after transmission. 1800 MHz module 222 may also incorporate DPD or CFR processing, such that some level of interference may be canceled or mitigated at 1800 MHz module 222. Various configurations of modules within enhanced base station 201 may be contemplated for canceling interference and self-interference. SIC module 225 may also be coupled with 1800 MHz module 222.

Figure 3:
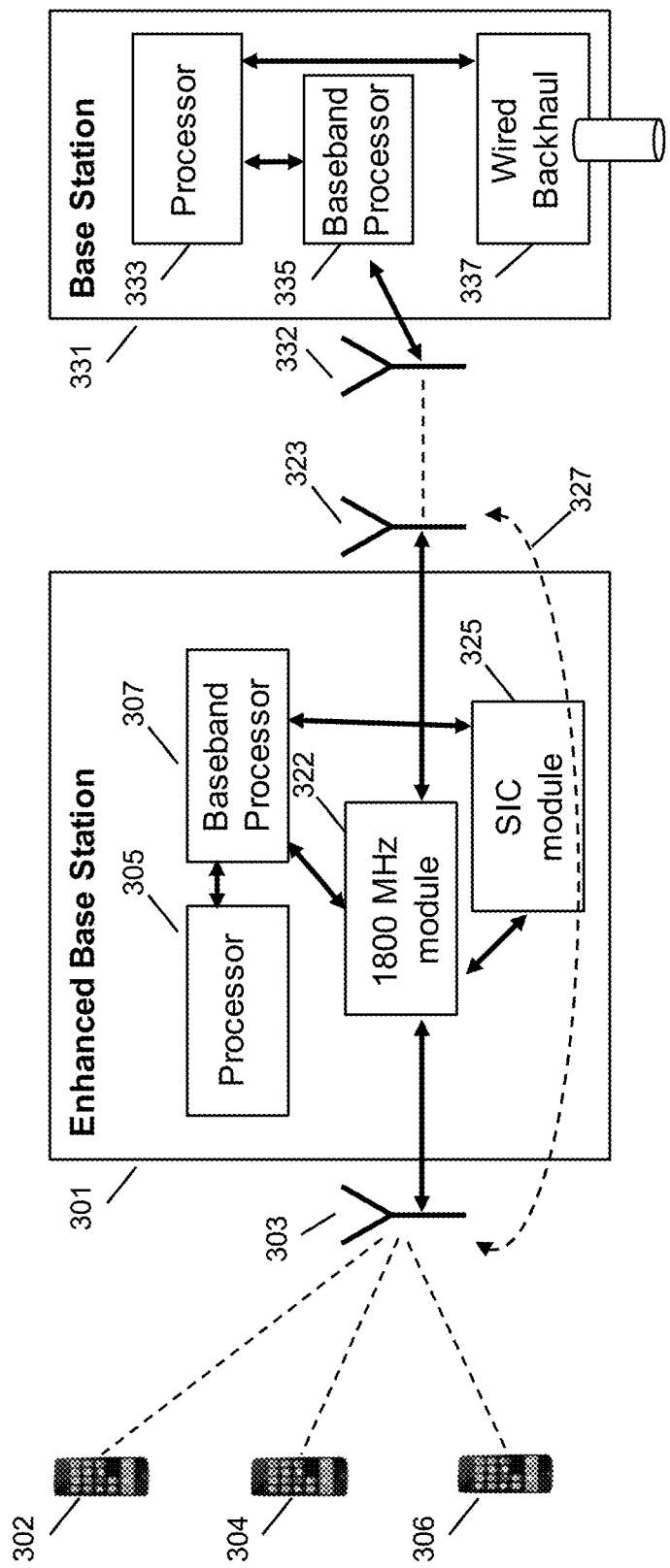
FIG. 3 is a schematic diagram of a base station in communication with a second base station in a mesh configuration, in accordance with some embodiments.

FIG. 3 is a schematic diagram of a base station in communication with a second base station in a mesh configuration, in accordance with some embodiments. Base station 301 provides access to UEs 302, 304, 306 via antenna 303 on the 1800 MHz band, and base station 331 provides backhaul to base station 301. Base station 301 includes processor 305 and baseband processor 307, and baseband processor is in communication with 1800 MHz module 322, which may also include a power amplifier and a filter and/or multiple transmit/receive chains within the module. Baseband processor 307 is also in communication with SIC module 325. SIC module 325 is coupled to antennas 303 and 323 and generates canceling signals to cancel self-interference generated by either antenna at the other antenna. SIC module 325 may also be coupled with 1800 MHz module 322.

Base station 301, via 1800 MHz module 322 and antenna 323, is in radio communication with base station 331 via antenna 332. This communication is using the same band as is used by UEs 302, 304, 306, but using SIC enables the communications to not interfere. Base station 331 includes processor 333, in communication with baseband processor 335, as well as a radio transmit/receive chain that is not shown. Base station 331 also includes wired backhaul 337, which is coupled to processor 333, and provides backhaul for both base station 301 and base station 331. In this way, a mesh backhaul system can utilize wireless backhaul at some nodes and wired backhaul at other nodes, while using self-interference cancellation to permit access and backhaul using the same band.

Figure 4:
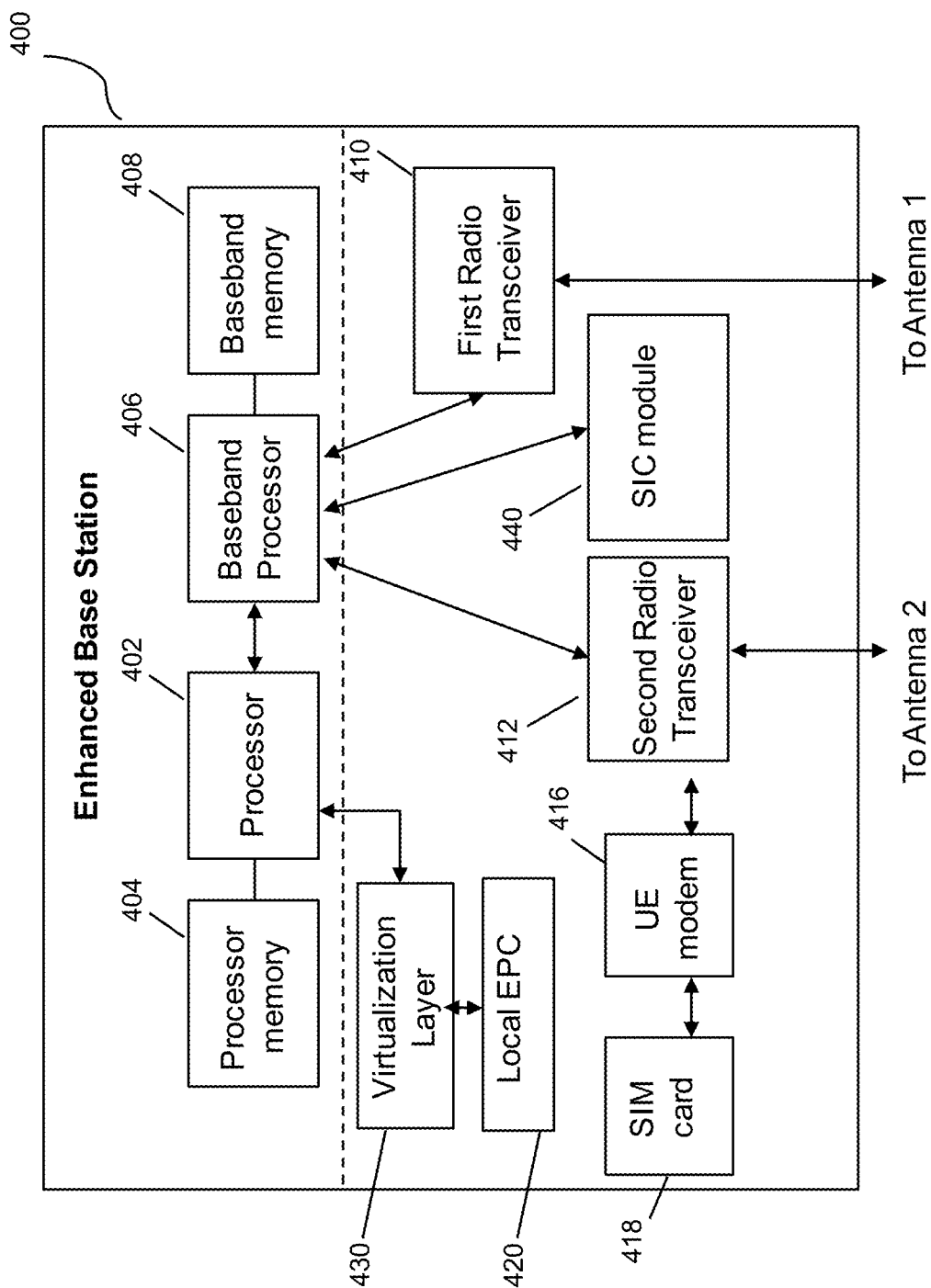
FIG. 4 is a schematic diagram of a mesh network base station, in accordance with some embodiments.

FIG. 4 is a schematic diagram of a mesh network base station, in accordance with some embodiments. Mesh network base station 400 may include processor 402, processor memory 404 in communication with the processor, baseband processor 406, and baseband processor memory 408 in communication with the baseband processor. Base station 400 may also include first radio transceiver 410 and second radio transceiver 412, SIC module 440, internal universal serial bus (USB) port 416, and subscriber information module card (SIM card) 418 coupled to USB port 414. In some embodiments, the second radio transceiver 412 itself may be coupled to USB port 416, and communications from the baseband processor may be passed through USB port 416.

A virtualization layer 430 may also be included for mediating communications with an evolved packet core EPC, specifically including the core network EPC (not shown) and local evolved packet core (EPC) module 420. Local EPC 420 may be used for authenticating users and performing other EPC-dependent functions when no backhaul link is available. Virtualization layer 430 and local EPC 420 may each run on processor 402 or on another processor, or may be located within another device.

Processor 402 and baseband processor 406 are in communication with one another. Processor 402 may perform routing functions, and may determine if/when a switch in network configuration is needed. Baseband processor 406 may generate and receive radio signals for both radio transceivers 410 and 412, based on instructions from processor 402. In some embodiments, processors 402 and 406 may be on the same physical logic board. In other embodiments, they may be on separate logic boards.

Baseband processor 406 may also provide processing for SIC module 440. SIC module 440 may receive signals from radio transceiver 410 and 412, either by signal taps (not shown), internal transmission of the radio signals, via baseband processor 406, or another means. SIC module 440 may cancel interference caused by radio transceiver 410 for itself, interference caused by radio transceiver 412 for itself, interference caused by radio transceiver 410 for transceiver 412, interference caused by radio transceiver 412 for transceiver 410, or some combination thereof, as further defined elsewhere herein.

The first radio transceiver 410 may be a radio transceiver capable of providing LTE eNodeB functionality, and may be capable of higher power and multi-channel OFDMA. The second radio transceiver 412 may be a radio transceiver capable of providing LTE UE functionality. Both transceivers 410 and 412 are capable of receiving and transmitting on one or more LTE bands. In some embodiments, either or both of transceivers 410 and 412 may be capable of providing both LTE eNodeB and LTE UE functionality. Transceiver 410 may be coupled to processor 402 via a Peripheral Component Interconnect-Express (PCI-E) bus, and/or via a daughtercard. As transceiver 412 is for providing LTE UE functionality, in effect emulating a user equipment, it may be connected via the same or different PCI-E bus, or by a USB bus, and may also be coupled to SIM card 418.

SIM card 418 may provide information required for authenticating the simulated UE to the evolved packet core (EPC). When no access to an operator EPC is available, local EPC 420 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 410 and 412, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 402 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 410 and 412. Baseband processor 406 may use memory 408 to perform these tasks.

Further Embodiments

A multi-RAT (radio access technology) device may be used that incorporates several different types of radios, e.g., television white space (TVWS), Wi-Fi, IEEE 802.11a/b/g/n/ac/ad/ah/af, LTE, 3G, 4G, 5G, microwave, Ka band, public safety band, and other radios. SIC may be employed to reduce self-interference on each of these radios and/or among each of these radios, even if they do not operate on the same frequency band.

In some embodiments, the use of one, more than one, or multiple frequency bands as designated by the LTE E-UTRA specification is contemplated. For a list of frequency bands and channel bandwidths, the reader is referred to 3GPP TS 36.101 Table 5.5-1 "E-UTRA Operating Bands," available in Release 10, version 10.15.0, available Jul. 4, 2014, and hereby incorporated herein in its entirety.

In some embodiments, since LTE UEs are not ordinarily configured to perform downlink on bands designated for uplink, such as the 788-798 MHz band for Band 14, a second specially-configured antenna may be used to provide UE downlink on this special band. In some embodiments, the base station may be flexibly configured such that each antenna may be used for either uplink or downlink on various bands, including standard uplink-only or downlink-only bands.

In some embodiments, one or more mobile mesh network nodes may have local packet cores internal to the network nodes. Additional applications may be provided within the mobile mesh network, such as push-to-talk (PTT), IPSEC security, mobile edge computing applications, protocol translation and proxying, or other applications.

An additional method for canceling interference is to physically isolate, insulate, or separate the antennas used. This method may be combined with any of the other methods described herein to enable additional interference cancellation.

In some embodiments, a mobile mesh network may support multiple full-duplex connections. For example, a single mobile mesh network node may have a full-duplex connection for providing wireless backhaul to a gateway with a wired network node. Additionally, nodes may have full-duplex connections between each other. The links may be in any configuration between nodes. In some embodiments, where the nodes are connected via LTE, the full-duplex connections may be used to provide role reversal between UE and eNodeB roles to optimize bandwidth in the mesh network.

In some embodiments, carrier aggregation may be used in conjunction with the full-duplex and/or self-interference cancellation techniques described herein. In some embodiments, beamforming and/or multiple-input multiple-output antennas may be used to provide spatial interference cancellation, in addition to the self-interference cancellation techniques described herein.

In some embodiments, a mobile base station may be on a drone or otherwise airborne. In some embodiments, the mobile base station may be on a fixed or mobile tower.

In some embodiments, multiple-in, multiple-out (MIMO) may be enabled using full-duplex MIMO techniques. One, two, or more antennas may be supported for SIC, in addition to or in combination with any of the embodiments described herein.

In some embodiments, a television white space band may be identified as available, either by direct monitoring or by consultation of a monitoring database. The available TVWS band may be used for LTE full-duplex communications, in accordance with the embodiments described elsewhere herein.

In some embodiments, a mobile base station may be configured to operate in two modes. In a first mode, a mobile base station may be configured to provide full-duplex communication with other base stations, but half-duplex communication with UEs. In a second mode, a mobile base station may be configured to provide full-duplex communication with both other base stations and with UEs. One or both modes may be supported. In some embodiments, a third mode may be provided in which the communications between UEs are provided using asymmetric LTE links, with role reversal being used as needed to maximize available network capacity, but using self-interference cancellation on the asymmetric links.

In the present disclosure, the words "eNodeB" or "eNodeB" are used to refer to a cellular base station. However, one of skill in the art would appreciate that it would be possible to provide the same functionality and services to other types of base stations, specifically to home eNodeBs (HeNodeBs), as well as any equivalents.

While the present disclosure uses the term "small cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc.

In some embodiments, the base stations described herein may be compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. For example, while the use of a single frequency band may be described, many frequency bands may be used in conjunction with the single frequency band. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

The invention claimed is:

1. A mesh network comprising:
   a plurality of base stations in communication with each other;
   wherein the base stations form, without coordination from a core network, a self-organizing mesh with access and backhaul; and
   wherein an X2 protocol message exchange is used to reserve a single frequency band; thereby enabling the creation of a mesh wireless network via the first base station, the mesh wireless network having both access and backhaul using only the single frequency band and providing backhaul connectivity to a plurality of mobile devices connected to the second base station and the third base station through the first base station, and wherein the plurality of base stations comprise a single antenna for both transmitting and receiving on the single frequency band for both access and backhaul.

2. The mesh network of claim 1 further comprising a macro cell and wherein signaling is performed between a macro cell and a base station.

3. The mesh network of claim 1 wherein signaling is performed between base stations.

4. The mesh network of claim 1 further comprising a policy server and wherein signaling is performed between the policy server and at least one of the plurality of base stations, for storing and retrieving policies relating to frequency or time channel multiplexing and reuse.

5. The mesh network of claim 1 wherein coordination takes into account which base stations have self-interference cancellation (SIC) and which do not.

6. The mesh network of claim 1 wherein the base stations are observed by measurement reports to be interfering with which other base stations.

7. The mesh network of claim 1 further comprising a self-interference cancellation circuit for canceling interference at a first base station caused by transmission of data received from a second base station and a third base station.

8. The mesh network of claim 1, the first base station further comprising a self-interference cancellation circuit for canceling interference caused by transmission from the first transceiver at the first transceiver, and for cancelling interference caused by transmissions from the second transceiver at the second transceiver.

9. A method of operating a mesh network comprising:
providing a plurality of base stations in communication with each other;
forming, by the base stations, a self-organizing mesh with access and backhaul without coordination from a core network; and
using an X2 protocol message to reserve frequency channels or time division channels within the mesh network and wherein the plurality of base stations comprise a single antenna for both transmitting and receiving on a single frequency band for both access and backhaul.

10. The method of claim 9 further comprising performing signaling between a macro cell and a base station of the mesh network.

11. The method of claim 9 further comprising performing signaling between base stations.

12. The method of claim 9 further comprising performing signaling between a policy server at least one of the plurality of base stations, for storing and retrieving policies relating to frequency or time channel multiplexing and reuse.

13. The method of claim 9 further comprising performing coordination taking into account which base stations have self-interference cancellation (SIC) and which do not.

14. The method of claim 9 further comprising observing the base stations by measurement reports to be interfering with which other base stations.

15. The method of claim 9 further comprising canceling, by a self-interference cancellation circuit, interference at a first base station caused by transmission of data received from a second base station and a third base station.

16. A non-transitory computer-readable medium containing instructions for operating a mesh network, when executed, cause the network to perform steps comprising:
providing a plurality of base stations in communication with each other;
forming, by the base stations, a self-organizing mesh with access and backhaul without coordination from a core network; and
using an X2 protocol message to reserve frequency channels or time division channels within the mesh network and wherein the plurality of base stations comprise a single antenna for both transmitting and receiving on a single frequency band for both access and backhaul.

17. The non-transitory computer-readable medium of claim 16 further comprising instructions for performing signaling between a macro cell and a base station of the mesh network.

18. The non-transitory computer-readable medium of claim 16 further comprising instructions for performing signaling between base stations.

19. The non-transitory computer-readable medium of claim 16 further comprising instructions for performing signaling between a policy server at least one of the plurality of base stations, for storing and retrieving policies relating to frequency or time channel multiplexing and reuse.

20. The non-transitory computer-readable medium of claim 19 further comprising instructions for performing coordination taking into account which base stations have self-interference cancellation (SIC) and which do not.

21. The non-transitory computer-readable medium of claim 19 further comprising observing the base stations by measurement reports to be interfering with which other base stations, and canceling, by a self-interference cancellation circuit, interference at a first base station caused by transmission of data received from a second base station and a third base station.

* * * * *